Dec. 29, 1970 G. L. FLEMMERT 3,551,098
PROCESS FOR DECOMPOSING SODIUM FLUOSILICATE AND/OR SODIUM
BIFLUORIDE INTO SODIUM FLUORIDE, HYDROGEN FLUORIDE
AND SILICON TETRAFLUORIDE
Filed Jan. 12, 1968 2 Sheets-Sheet 1

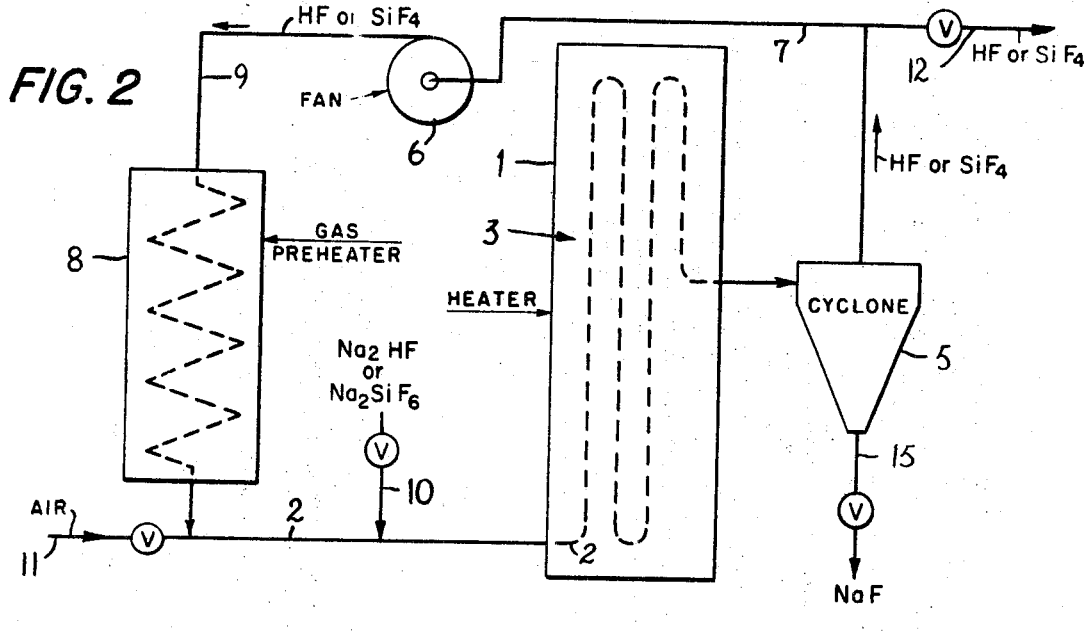
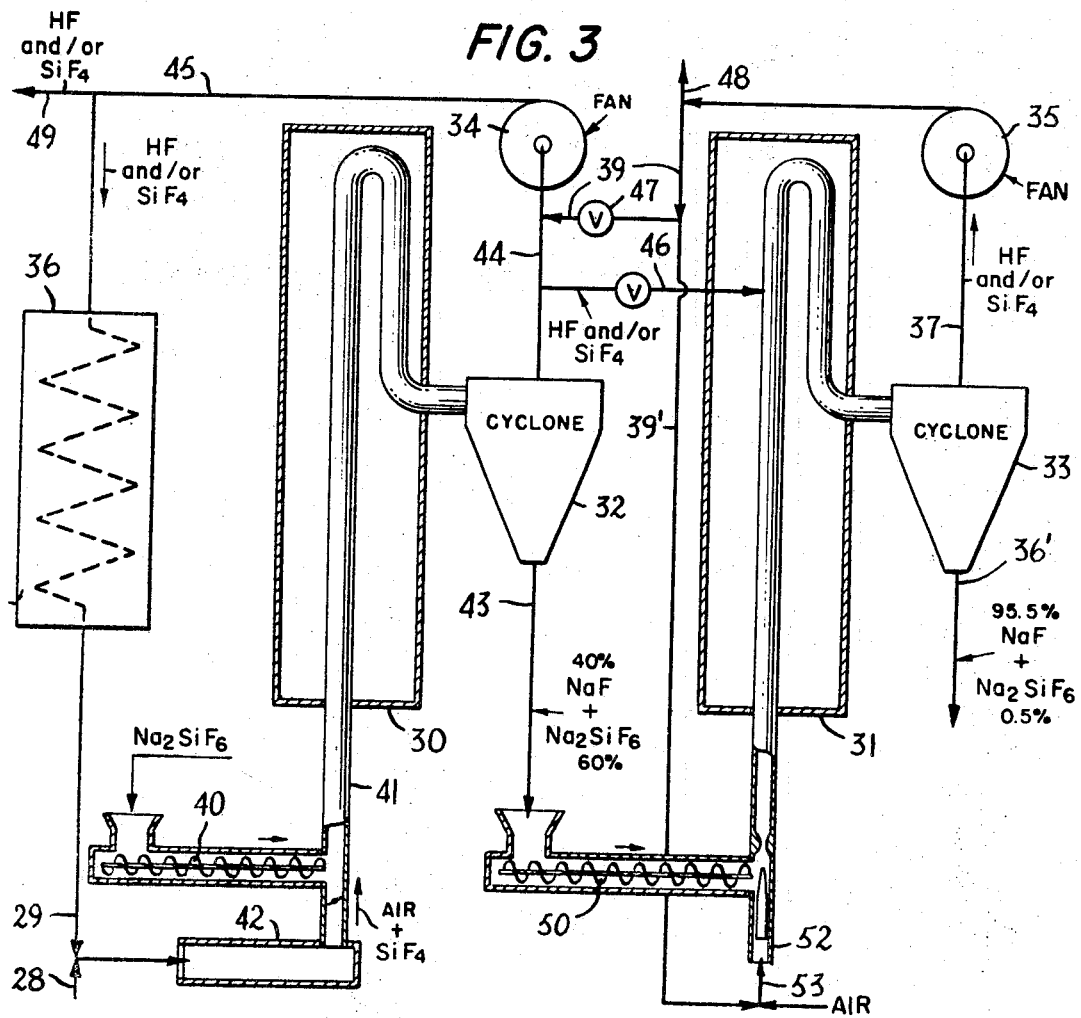

United States Patent Office 3,551,098
Patented Dec. 29, 1970

3,551,098
PROCESS FOR DECOMPOSING SODIUM FLUO-SILICATE AND/OR SODIUM BIFLUORIDE INTO SODIUM FLUORIDE, HYDROGEN FLUORIDE AND SILICON TETRAFLUORIDE
Gösta Lennart Flemmert, Hamngatan 22, Nynashamn, Sweden
Filed Jan. 12, 1968, Ser. No. 697,452
Int. Cl. C01d *3/02, 7/22*
U.S. Cl. 23—88       11 Claims

ABSTRACT OF THE DISCLOSURE

A process is provided for decomposing sodium bifluoride and/or sodium fluosilicate into hydrogen fluoride, silicon tetrafluoride, and sodium fluoride, which comprises entraining particles of the sodium bifluoride and/or sodium fluosilicate having an average particle diameter of less than about 1 mm. in a turbulent stream of inert gas at a Reynolds number within the range from about $10^4$ to about $10^6$, and heating the entrained particles at a temperature at which the sodium bifluoride and/or sodium fluosilicate is decomposed, in sequence, if desired, and separating the sodium fluoride, hydrogen fluoride, and silicon tetrafluoride thereby obtained.

Apparatus also is provided for decomposing solid complex fluorides, such as sodium fluosilicate and sodium bifluoride, separately or in admixture, comprising, in combination, means for entraining particles of the complex fluorides having an average diameter below about 1 mm. in a stream of inert gas, means for introducing such gas at a Reynolds number within the range from about $10^4$ to about $10^6$, means for heating the entrained particles at a temperature at which they are decomposed, and means for separating the solid sodium fluoride product from the inert gas and from any gaseous decomposition products, including hydrogen fluoride and silicon tetrafluoride.

---

This invention relates to a process and apparatus for decomposing sodium bifluoride and sodium fluosilicate into hydrogen fluoride, silicon tetrafluoride and sodium fluoride, and more particularly to a process for decomposing sodium bifluoride and sodium fluosilicate having an average particle diameter of less than about 1 mm. in a turbulent stream of inert gas at an elevated temperature at which the sodium bifluoride and sodium fluosilicate are decomposed.

Flemmert U.S. Pat. No. 2,819,151, patented Jan. 7, 1958, describes a process for reacting silicon fluorides, such as silicon tetrafluoride, in the vapor phase with oxygen and a combustible gas to form silicon dioxide and hydrogen fluoride. The process is especially suited for making silicon dioxide in the form of amorphous finely-divided particles ranging from about 5 to about 50 microns in mean diameter.

In the cyclic process, the hydrogen fluoride and silicon tetrafluoride in the effluent from the combustion reaction can be recovered by absorbing them in water, or on solid sodium fluoride to form a complex sodium bifluoride or sodium fluosilicate. The sodium bifluoride and sodium fluosilicate can then be heated to decompose them, forming hydrogen fluoride, silicon tetrafluoride and sodium fluoride, any or all of which can be recycled for further reaction. The following scheme of reactions takes place:

Stage I
(1)     $4HF + SiO_2 \rightarrow SiF_4\uparrow + 2H_2O$

Stage II
(2)     $SiF_4 + 2H_2O \rightarrow SiO_2\downarrow + 4HF$

Stage III
(3)     $HF + NaF \rightarrow NaHF_2$
(4)     $SiF_4 + 2NaF \rightarrow Na_2SiF_6$ Stage IV
(5)     $NaHF_2 \xrightarrow{\Delta} HF\uparrow + NaF$
(6)     $Na_2SiF_6 \xrightarrow{\Delta} SiF_4\uparrow + 2NaF$ A mixture of sodium fluosilicate and sodium bifluoride can be decomposed in sequence, so as to yield the gases separately, in a manner in which they can be separately recovered. When the mixture is heated to about 350° C., the sodium bifluoride only is decomposed, to yield sodium fluoride and hydrogen fluoride, which escapes and may be recovered by condensation. Sodium fluosilicate is decomposed at temperatures of from 550 to 750° C., liberating the silicon tetrafluoride, which can be recycled for reuse.

Flemmert U.S. patent No. 3,087,787, patented Apr. 30, 1963, describes an adaptation of the process of No. 2,819,151 for the preparation of hydrogen fluoride from cheap and readily accessible fluorine- and silicon-containing raw materials. In this process, the silicon dioxide in finely-divided form is obtained as a useful by-product. This process can also be operated as a cyclic process, in which all of the fluorine in the raw material is eventually recovered as hydrogen fluoride. The following reactions take place:

Stage I
(1)     $H_2SO_4 + CaF_2 \rightarrow CaSO_4 + 2HF\uparrow$
(2)     $4HF + SiO_2 \rightarrow SiF_4\uparrow + 2H_2O$ Stage II
(3)     $SiF_4 + 2H_2O \rightarrow SiO_2\downarrow + 4HF$ Stage III
(4)     $HF + NaF \rightarrow NaHF_2$
(5)     $SiF_4 + 2NaF \rightarrow Na_2SiF_6$ Stage IV
(6)     $NaHF_2 \xrightarrow{\Delta} HF\uparrow + NaF$
(7)     $Na_2SiF \xrightarrow{\Delta} SiF_4\uparrow + 2NaF$ In this process, too, a mixture of sodium fluosilicate and sodium bifluoride is obtained, which is decomposed in sequence, so as to yield hydrogen fluoride and silicon tetrafluoride separately, in a manner in which they can be separately recovered.

The step of decomposition of sodium bifluoride and sodium fluosilicate in these cyclic processes is not easy to accomplish efficiently on a commercial scale. In a laboratory, the chemicals are easily handled. In a large chemical plant, however, a serious corrosion problem is encountered, and further severe problems arise depending on the fact that sodium fluoride has a pronounced tendency to stick to the heat transfer surfaces.

Meyerhofer in British patents Nos. 249,860 and 303,760, and in German patent No. 546,116, describes a process for decomposition of sodium fluosilicate by heating a bed of particles of the fluosilicate at a temperature below their melting point. It is quite difficult under the conditions described to ensure complete decomposition of the sodium fluosilicate particles. It is also difficult to heat particles in the bed uniformly, and avoid decomposition of the sodium fluosilicate until all of the sodium bifluoride has been decomposed.

In accordance with the invention, a process is provided for decomposing sodium bifluoride and/or sodium fluosilicate into hydrogen fluoride, silicon tetrafluoride, and sodium fluoride, which comprises entraining particles of the sodium bifluoride and/or sodium fluosilicate having an average particle diameter of less than about 1 mm. in a turbulent stream of inert gas at a Reynolds Number within the range from about $10^4$ to about $10^6$, and heating the entrained particles at a temperature at which the sodium bifluoride and/or sodium fluosilicate is decomposed, in sequence, if desired, and separating the sodium fluoride, hydrogen fluoride, and silicon tetrafluoride thereby obtained.

The process of the invention is applicable to the decomposition of sodium bifluoride separately, sodium fluosilicate separately, and mixtures of sodium bifluoride and sodium fluosilicate. The mixtures can be processed in a manner to decompose the sodium bifluoride, and then the sodium fluosilicate, thus making it possible to separate hydrogen fluoride and sodium tetrafluoride from the decomposition products, recovering all of the sodium fluoride together at the conclusion of the decomposition of the sodium fluosilicate. This is accomplished by control of the decomposition temperature.

Sodium bifluoride will decompose at a temperature within the range from about 250 to about 500° C., and sodium fluosilicate will decompose at a temperature within the range from about 550 to about 750° C. Accordingly, use of temperatures below 550° C. will ensure that the sodium fluosilicate will not be decomposed, but that the sodium bifluoride will be decomposed.

It is important that the sodium fluosilicate be heated at a temperature below the melting or softening temperature of the particles. A eutectic mixture of sodium fluosilicate and sodium fluoride will melt at a temperature of approximately 750° C. or slightly above, and accordingly, the temperature should be below this softening temperature, or below about 750° C. The exact softening temperature depends upon the composition of the mixture formed, i.e., the relative proportions of sodium fluosilicate and sodium fluoride.

The invention also provides apparatus for decomposing solid complex fluorides, such as sodium fluosilicate and sodium bifluoride, separately or in admixture, comprising, in combination, means for entraining particles of the complex fluorides having an average diameter below about 1 mm. in a stream of inert gas, means for introducing such gas at a Reynolds number within the range from about $10^4$ to about $10^6$, means for heating the entrained particles at a temperature at which they are decomposed, and means for separating the solid sodium fluoride product from the inert gas and from any gaseous decomposition products, including hydrogen fluoride and silicon tetrafluoride. It is desirable that any conduits or pipes in the apparatus have a diameter of at least about 40 mm., in order to prevent plugging of the pipes or conduits with solid material in the course of the decomposition reaction.

The invention is illustrated in the accompanying drawings, in which:

FIG. 2 represents a typical apparatus in accordance with the invention having one stage for decomposing solid complex fluorides.

FIG. 3 represents another form of apparatus in accordance with the invention, having two stages for decomposing complex fluorides.

Figure 1:
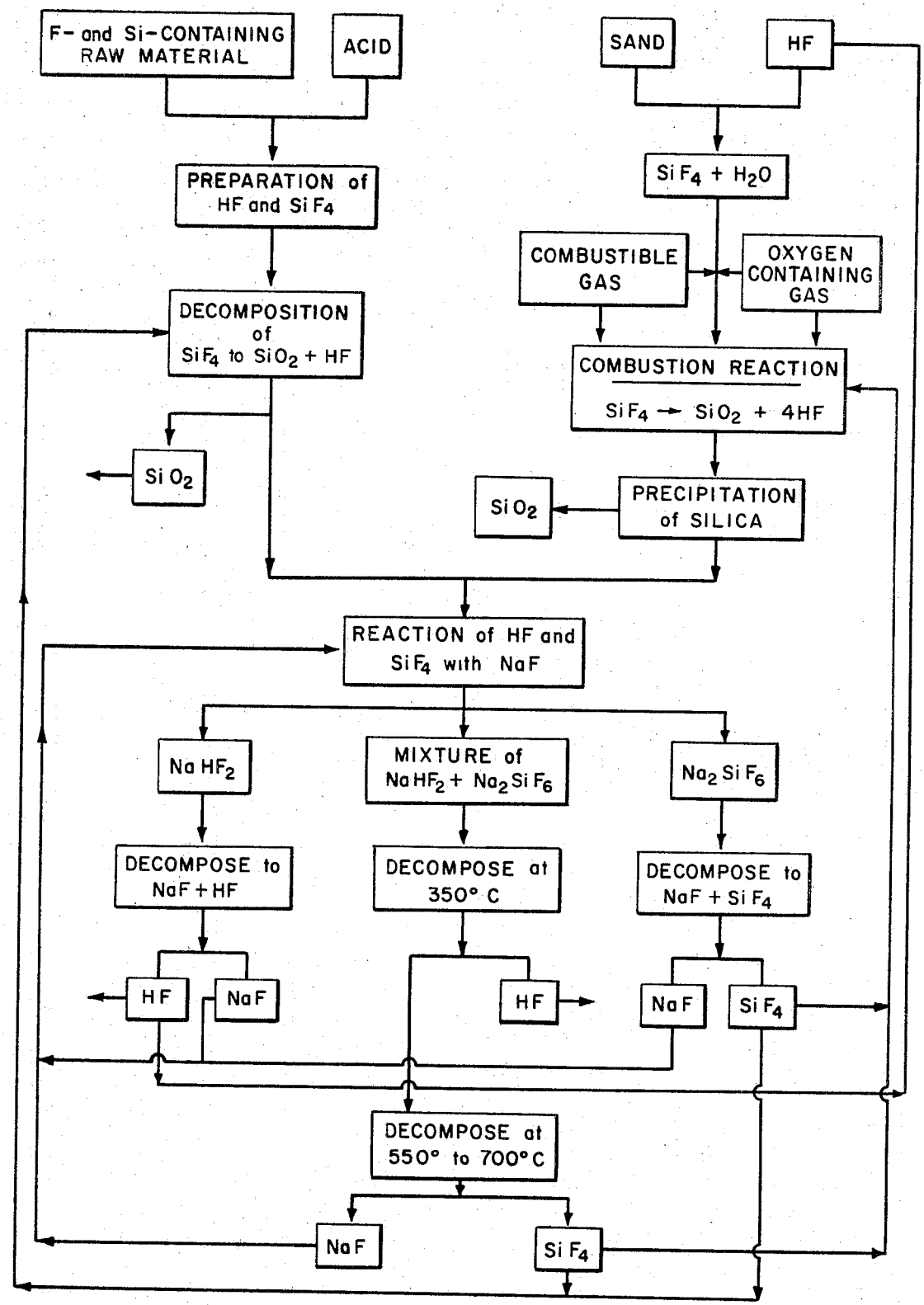
FIG. 1 represents a flow sheet of a cyclic process in accordance with the invention.

The process of the invention features the entrainment of the complex fluoride particles in a turbulent gas stream. The particles have an average diameter below about 1 mm., in order to ensure rapid and complete decomposition of the particles in a short time interval, and in order to ensure entrainment of the particles in the stream of gas. The particles can be reduced to the required particle size by any desired technique, such as grinding, milling, or pulverizing, using, for example, a ball mill, or a pebble mill, or a Gaulin mill. The technique by which the particles are reduced to the required size forms no part of this invention, but will be evident to anyone skilled in the art.

Any gas that is nonreactive or inert under the decomposition conditions can serve as the entraining gas, including, for example, nitrogen, argon, helium and krypton. In the case of sodium bifluoride decomposition, a particularly desirable inert gas is the gaseous decomposition product itself, hydrogen fluoride. This is preferred, inasmuch as no separation is required in order to recover useful gaseous reaction products. If desired, the hydrogen fluoride can of course be diluted with another inert gas.

In the case of sodium fluosilicate decomposition, silicon tetrafluoride can also serve as the inert entraining gas.

The decomposition temperature will depend upon the complex fluorides present. As indicated, sodium bifluoride will decompose at temperatures of from about 250 to about 500° C., and sodium fluosilicate at temperatures from about 500° to about 750° C. The reactions that take place are as follows:

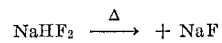

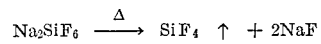

The decomposition is quite rapid, due to the fine state of subdivision of the fluoride, and can take place in as little as a few seconds, although at low temperatures several minutes of exposure to the decomposition temperature may be necessary.

It is important for the decomposition reaction that the entraining gas be at a high turbulence. The turbulence is defined according to Reynolds Number. Reynolds Number is defined by the equation:

$$N_R = \frac{d.v. \text{ diameter of pipe}}{\mu}$$

In the above equation, $N_R$ is the Reynolds Number, $d$ is the density of the gas, $v$ is the velocity of the gas, and $\mu$ is the viscosity of the gas. Thus, the Reynolds Number depends upon the diameter of the pipe or conduit through which the gas mixture is passing, the viscosity of the gas, the velocity of the gas, and the density of the gas. These are adjusted in accordance with the invention to give a Reynolds Number within the range from about $10^4$ to about $10^6$.

While the conduit can have any desired diameter, it has been noted that the conduit should in most cases have a diameter of at least about 40 mm. in order to prevent plugging with solid materials in many processes. The tendency towards plugging depends upon the decomposition temperature, the solid materials present, and the gas velocity and viscosity. However, sodium fluoride in a proportion of from about 10 to about 20% by weight of the entrained particles helps to prevent plugging. Silica particles and carbon black particles in amounts up to about 5% are also effective for this purpose. The reason for this effect is not known.

At the conclusion of the decomposition reaction, the solid particles entrained in the gas consist substantially entirely of sodium fluoride, and the gases include the hydrogen fluoride and/or silicon tetrafluoride gaseous decomposition products. The solid sodium fluoride is readily separated from the gases by conventional techniques, such as the use of a cyclone separator or a gas centrifuge. The sodium fluoride can be reused for the preparation of additional silica or hydrogen fluoride, as the case may be, as shown in FIG. 1. The proportion of sodium bifluoride or sodium fluosilicate is so small that the contaminant can be safely ignored when the sodium fluoride is used in either of these processes, and is usually less than about 0.5% by weight.

FIG. 1 represents a flow sheet showing application of the process of the invention in the preparation of either hydrogen fluoride or silica. The production of silica can be carried out in accordance with the Flemmert patent No. 2,819,151, and the production of hydrogen fluoride in accordance with the Flemmert patent No. 3,087,787, and consequently the details of these processes, which are adequately set out in these patents, will not be duplicated here, but are instead incorporated by reference, for the sake of brevity. In either case, as is evident from the flow sheet, the product that is obtained by reaction of hydrogen fluoride and silicon tetrafluoride with sodium fluoride is a mixture of sodium bifluoride and sodium fluosilicate, or these compounds taken separately, depending on the circumstances of the absorption.

The separate decomposition of sodium bifluoride and of sodium fluosilicate presents no difficulties, and can be carried out at a suitable decomposition temperature, in order to recover hydrogen fluoride and sodium fluoride in the case of sodium bifluoride, and sodium fluoride and silicon tetrafluoride, in the case of sodium fluosilicate. A mixture of sodium bifluoride and sodium fluosilicate is best processed in two stages, decomposing the sodium bifluoride in the first stage at a temperature of from 250 to 500° C., and decomposing the sodium fluosilicate in the second stage at a temperature of from 550 to 750° C. The sodium fluoride is then recycled to the absorption of hydrogen fluoride and silicon tetrafluoride. The silicon tetrafluoride is recycled to an earlier stage, and the hydrogen fluoride also is recycled, or used, as the case may be. In both processes, silica is obtained as a useful by-product.

The apparatus shown in FIG. 2 is especially designed for the decomposition of sodium bifluoride, and comprises a heated decomposition reactor 1, composed of an elongated conduit 2, arranged in a serpentine configuration for a long travel path within the reactor, and a heater 3 for bringing the reactor to the desired reaction temperature. A cyclone 5 is provided for separation of solid sodium fluoride delivered by conduit 2 from the reactor. The high powered fan 6 in line 7, capable of creating a gas turbulence at Reynolds numbers of from $10^4$ to $10^6$, circulates the gases through the system at this turbulence value. A gas preheater 8 preheats the entraining gases in line 9 from the fan.

The entry line 10 is for introduction of sodium bifluoride into the system, and line 11 is for the introduction of entraining gases into the system, such as inert gas or air. The line 10 connects with the line 2 running between the gas preheater and the reactor, and it is the line 2 that follows a serpentine route through the reactor, terminating finally at the cyclone 5.

The cyclone is provided with an outlet port 15 at the bottom for removal of solid sodium fluoride. The line 7 at the top runs back to the fan, and the line 9 connects the fan to the preheater.

The system shown is adapted to function with a circulating hydrogen fluoride atmosphere, using hydrogen fluoride obtained by decomposition of sodium bifluoride, or with a circulating silicon tetrafluoride atmosphere, obtained by decomposition of sodium fluosilicate. A bleed line 12 is provided off line 7, for bleeding off hydrogen fluoride from time to time, or continuously, as may be desired, in order to maintain the desired gas pressure.

In operation, sodium bifluoride or sodium fluosilicate, suitably reduced to a particle size of less than 1 mm. in diameter, is added to line 2 by way of line 10, where it is entrained in gases, in this case, hydrogen fluoride or silicon tetrafluoride, coming from preheater 8, and passes through the reactor.

The reactor, in the case of sodium bifluoride, is brought to a temperature of from 250 to 350° C. The turbulence and velocity of the gas through the line 2 are such that by the time the particles of sodium bifluoride reach the end of the reactor, they have been decomposed essentially completely into sodium fluoride and hydrogen fluoride. The sodium fluoride is separated in the cyclone 5, and is removed continuously or from time to time through the outlet line 15. Hydrogen fluoride is recirculated by way of the fan 6 through the gas preheater 8, where it is brought to a temperature higher than or approximating the decomposition temperature to be used, in order to ensure that through substantially the entire course of travel through the reactor the sodium bifluoride will be at the decomposition temperature, having been previously warmed by the hot hydrogen fluoride from the preheater.

It will be evident that the system can equally well be used for the decomposition of sodium fluosilicate. In this case, the circulating atmosphere is preferably silicon tetrafluoride, possibly mixed with air since silicon tetrafluoride is the gaseous decomposition product. Sodium fluoride is removed in the cyclone as before. The only difference in operation is that the decomposition temperature is somewhat higher, within the range from about 550 to about 750° C. In this case, it is desirable to keep the temperature below 750° C., in order to avoid formation of the eutectic melt in sodium fluosilicate and sodium fluoride, formed in the course of the decomposition. Should the particles soften, they will adhere to the sides of the pipe 2, and this may result in clogging. Moreover, decomposition will be retarded, because the small particle size can be lost through agglomeration of the solid particles.

The apparatus having two stages of decomposition reaction shown in FIG. 3 is adapted to deal with a mixture of sodium bifluoride and sodium fluosilicate, or with sodium bifluoride or sodium fluosilicate alone. The system comprises two reactors 30 and 31, two cyclones 32 and 33, two fans 34 and 35, and one gas preheater 36. Since there are two heating or decomposition chambers in this system, it is possible to decompose sodium bifluoride in the first stage, and sodium fluorosilicate in the second stage, separately, or else decompose either alone but with a repeated decomposition heating, in order to ensure substantially complete decomposition.

For introduction of sodium bifluoride or sodium fluosilicate or a mixture of sodium bifluoride and sodium fluosilicate, the screw feeder 40 is provided, feeding directly into the line 41 leading to the first reactor 30. The line 41 extends from the air intake 42, which can be closed if sodium bifluoride is being processed, alone or in admixture, and inert gases fed in via line 28. The particles emerging from this reactor are then separated from the gases in the cyclone 32 and drawn out by the outlet line 43 at the base of the cyclone 32. The gases are taken off the top of the cyclone via line 44, and recycled by way of the fan 34 and line 45 through the preheater 36 and line 29 for entrainment of an additional portion of the solid materials at the base of the reactor 30. A bleed line 49 is provided for removing hydrogen fluoride or other gases in line 45. A feed line 46 is provided to feed the effluent gases into reactor 31, if desired.

The screw feeder 50 collects the solid materials from the cyclone 32, and feeds them into the second line 52 leading into the second reactor 31. This line also has an air intake 53, which can be closed if sodium bifluoride is present. The particles from this reactor are fed into the cyclone 33, and now consist substantially completely of sodium fluoride. Continuously or from time to time, the solid sodium fluoride particles are removed from the base of the cyclone via line 36', and can be recycled, as shown in FIG. 1. The gases are taken off the top of the cyclone in line 37, and can be fed back to the gas line 44 leading from the top of the first cyclone 32 by way of the fan 35 and line 39. A valve 47 permits the closing off of this line, in which case the gases from the second cyclone are recycled to the second reactor 31 by the recycle line 39', leading to line 52 by a second preheater (not shown). Excess gas can be taken off at bleed line 48. Thus, it is possible to separate hydrogen fluoride from the first cyclone, and to separate silicon tetrafluoride from the second cyclone, in the event that the first reactor is run at a temperature to decompose only sodium bifluoride, and the second reactor is run at a temperature to decompose sodium fluosilicate, and these gases can accordingly be separately recycled in each reactor, and returned separately to different parts of the reaction system, as shown in FIG. 1.

Operation of this system will first be illustrated using a mixture of sodium bifluoride and sodium fluosilicate. This mixture, reduced to a proper particle size below about 1 mm. in diameter is fed by the screw feeder 40 into the line 41, where it is entrained in gases, in this case hydrogen fluoride, coming from the preheater 36 via line 29 and preheated to about 250° C. It then is carried into the first reactor 30, which is kept at a temperature of from about 250 to about 500° C., preferably about 350° C. In the course of travel through the reactor, only the sodium bifluoride is decomposed, forming hydrogen fluoride and sodium fluoride, and this is of course mixed with sodium fluosilicate. The solid materials, sodium fluoride and sodium fluosilicate, are removed at the base of the cyclone 32, while the hydrogen fluoride is recirculated through the outlet line 44 and fan 34 to the preheater 36, and thence via line 29 for the entrainment of a further portion of the sodium bifluoride-sodium fluosilicate mixture. The excess of hydrogen fluoride is taken out via line 44.

The sodium fluoride and sodium fluosilicate mixture from cyclone 32 is fed through the screw feeder 50 to the line 52 which leads to the second reactor, and is entrained in a second stream of gas, in this case silicon tetrafluoride, from recycle line 39', diluted with air at air intake 53, and emerging via venturi 54 to better entrain the salt mixture from feeder 50. The reactor 31 is kept at a temperature of from 550 to about 750° C., preferably about 650 to 750° C. In the course of travel through the heater, the sodium fluosilicate is decomposed, forming more sodium fluoride, and silicon tetrafluoride. The sodium fluoride and any residual sodium fluosilicate, usually less than 0.5% under these reaction conditions, is removed at the base of the cyclone 33, and can be recycled as shown in FIG. 1. The silicon tetrafluoride is removed, via line 37, fan 35, and line 39, and with the valve 47 closed is taken off via lines 39 or 48 for recycling, as shown in FIG. 1.

If the apparatus of FIG. 3 be used only for the decomposition of sodium fluosilicate, then both reactors are kept at a temperature of from 550 to 750° C., preferably from 650 to 700° C., and the silicon tetrafluoride from the second reactor, since this is the only gaseous by-product, can be blended with the silicon tetrafluoride from the first reactor and recycled. Silicon tetrafluoride from the first reactor can be used for the entrainment of the particles in the second reactor, via line 39', leading into line 52. Continuously or from time to time, silicon tetrafluoride can be bled off via line 49 for recycling, as shown in FIG. 1.

The following examples in the opinion of the inventor represent preferred embodiments of this invention.

EXAMPLE 1

The apparatus shown in FIG. 2 was employed for the decomposition of sodium fluosilicate, obtained from the manufacture of silicon dioxide according to patent No. 2,819,151. The entraining gas was air, and the concentration of silicon tetrafluoride recirculated with the air was 7%. Air was fed into the system via line 11 at a temperature of 40° C. and the gas pressure was held at 0.03 kilo/sq. cm. The rate of flow of the air was 6 cubic meters per minute, and the sodium fluosilicate was at an average particle size of 0.5 mm. The decomposition temperature in the reactor was 670° C.

Under these conditions, 95% of the sodium fluosilicate was decomposed to sodium fluoride and silicon tetrafluoride. All of the silicon tetrafluoride was bled off via line 12 for recycling to the system as shown in FIG. 1.

EXAMPLE 2

Example 1 was repeated, using the apparatus of FIG. 1 for the decomposition of sodium fluorsilicate obtained from the manufacture of hydrogen fluoride according to Patent No. 3,087,787. In this acse, the silicon tetrafluoride obtained from the cyclone was recirculated, as the entraining gas, and no air was added; in other words, the reaction was carried out in a silicon tetrafluoride atmosphere. Silicon tetrafluoride was continuously recycled to the system, as shown in FIG. 1, to maintain a pressure of about 0.01 kilo/sq. cm. The silicon tetrafluoride was preheated to 660° C. before blending with the sodium fluosilicate, and the decomposition temperature was 690° C. in the reactor. The yield of sodium fluoride was 95%.

EXAMPLE 3

The apparatus shown in FIG. 3 was used to decompose sodium fluosilicate in two stages. In the first stage, air containing 2% of silicon tetrafluoride as the entraining gas was fed into the system via line 47 at 640° C., and the gas pressure was 0.03 kilo/sq. cm. The flow rate of the air was 6 cubic meters per minute, and the sodium fluosilicate fed into the air had an average particle size of 0.5 mm. The first stage heater was brought to 660° C. The gas emerging from the heater had a concentration of silicon tetrafluoride of 7%, and 85% of the sodium fluorsilicate was decomposed to sodium fluoride and silicon tetrafluoride.

The same flow rate and pressure were continued in the second heater stage, but the decomposition temperature was increased 10°, to 670° C. Via pipe 53 air was continuously fed into the system thus keeping the concentration of silicon tetrafluoride in the gases emerging from the heater at 2%. Thus sodium fluoride recovered in the cyclone was 99.5% sodium fluoride and 0.5% sodium fluosilicate.

EXAMPLE 4

The apparatus shown in FIG. 4 was employed for the decomposition of sodium bifluoride. The entraining gaseous atmosphere employed was hydrogen fluoride, at a pressure of ½ kilo/sq. cm., and a flow rate of 6 cubic meters per minute. The hydrogen fluoride was heated in the preheater to 350° C., and then combined with the sodium bifluoride, which had been brought to an average particle size of 0.5 mm. The entrained sodium bifluoride was then conducted to the heater, which was held at 400° C. The sodium fluoride recovered in the cyclone was 99.9% sodium fluoride, and 0.1% sodium bifluoride.

Having regard to the foregoing disclosure, the following is claimed as the inventive and patentable embodiments thereof:

1. A process for decomposing solid complex fluorides selected from the group consisting of sodium fluosilicate and sodium bifluoride and mixtures thereof, into their decomposition products selected from sodium fluoride, hydrogen fluoride and silicon tetrafluoride, which comprises entraining particles of the complex fluoride having an average particle diameter of less than about 1 mm. in a turbulent stream of inert gas at a Reynolds Number within the range from about $10^4$ to about $10^6$, heating the entrained particles at a temperature within the range from about 250 to about 750° C., but below the softening temperature of a eutectic mixture of sodium fluosilicate, if any, and sodium fluoride, and then separating the sodium fluoride and decomposition product gases thereby obtained.

2. A process in accordance with claim 1, in which the complex fluoride is sodium fluosilicate and the decomposition temperature is within the range from about 550 to about 750° C.

3. A process is accordance with claim 1 in which the complex fluoride is sodium bifluoride and the decomposition temperature is within the range from about 250 to about 500° C.

4. A process in accordance with claim 1 in which the gas is preheated at least to the decomposition temperature before entraining particles of complex fluoride therein.

5. A process in accordance with claim 1 in which the entrained particles are heated at the decomposition temperature for from about 0.5 to about 5 seconds.

6. A process in accordance with claim 1 in which the gaseous decomposition products are recycled at least once with an additional portion of complex fluoride after separating sodium fluoride therefrom.

7. A process in accordance with claim 1 in which the inert gas comprises an inert gas and gaseous decomposition products from the complex fluoride.

8. A process in accordance with claim 1 which comprises subjecting the complex fluoride to at least two decomposition reaction stages at the decomposition temperature while entrained in the inert gas, in order to ensure substantially complete decomposition.

9. A process in accordance with claim 1, which comprises circulating with the particles of complex fluoride from about 10 to about 20% of sodium fluoride.

10. A process in accordance with claim 1, which comprises circulating with the entrained particles of complex fluoride up to about 5% of silica, in order to inhibit plugging of the reaction system with solid materials.

11. A process in accordance with claim 1, which comprises circulating with the entrained particles of complex fluoride up to about 5% of carbon black, in order to inhibit plugging of the reaction system with solid materials.

References Cited

UNITED STATES PATENTS

| | | | |
|---|---|---|---|
| 1,730,915 | 10/1929 | Buchner | 23—88 |
| 1,896,697 | 2/1933 | Buchner | 23—88 |
| 1,918,377 | 7/1933 | Buchner | 23—279 |
| 2,426,557 | 8/1947 | Long | 23—153X |
| 2,588,786 | 3/1952 | Winter | 23—153 |
| 3,087,787 | 4/1963 | Flemmert | 23—153 |
| 3,323,861 | 6/1967 | Toyabe et al. | 23—88 |
| 3,338,673 | 8/1967 | Peterson et al. | 23—153 |

EDWARD STERN, Primary Examiner

U.S. Cl. X.R.

23—153, 205, 260

PO-1050
(5/69)

UNITED STATES PATENT OFFICE
CERTIFICATE OF CORRECTION

Patent No. 3,551,098        Dated December 29, 1970

Inventor(s) Gosta Lennart Flemmert

It is certified that error appears in the above-identified patent and that said Letters Patent are hereby corrected as shown below:

Column 3, line 53, "tetrafloride" should be --tetrafluoride--.
Column 4, line 25, that formula reading $$NaHF_2 \triangle + NaF$$ should read $$NaHF_2 \triangle HF\uparrow + NaF$$.

Column 6, line 35, "chambers" should be --stages--. Column 7, line 36, following "from", please insert --about--. Column 8, line 7, "acse" should be --case--; line 30, "fluorsilicate" should be --fluosilicate--; line 41, "4" should --2--; line 74, "is" should be --in--.

Signed and sealed this 10th day of August 1971.

(SEAL)
Attest:

EDWARD M. FLETCHER, JR.
Attesting Officer

WILLIAM E. SCHUYLER, JR.
Commissioner of Patents